Figure 2:
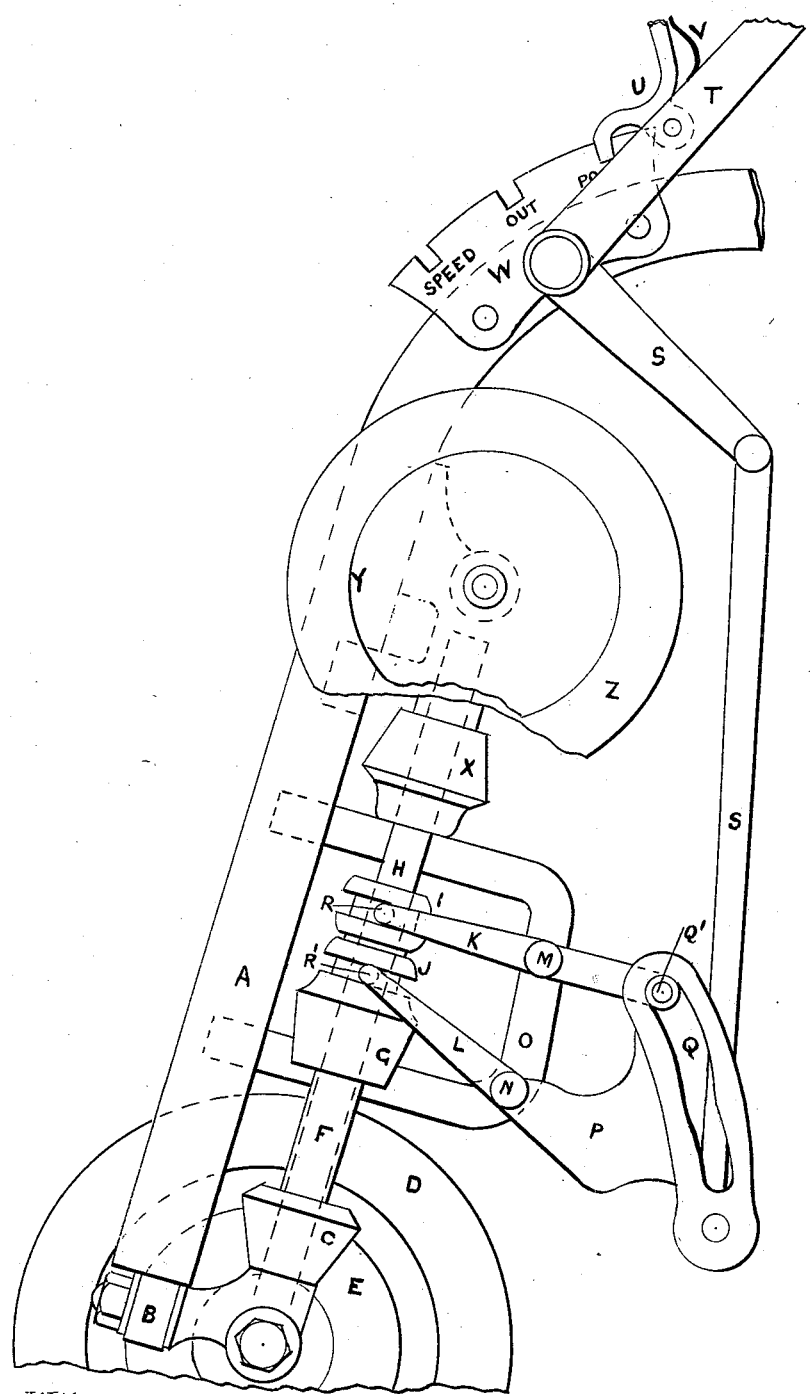

(No Model.) 3 Sheets—Sheet 1.
W. H. J. GROUT.
DIFFERENTIAL GEAR FOR VELOCIPEDES.
No. 254,639. Patented Mar. 7, 1882.
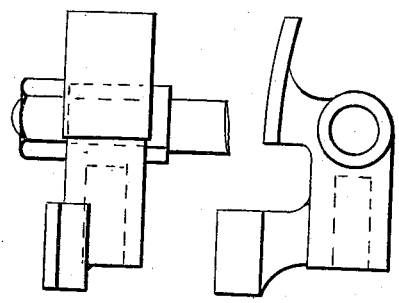
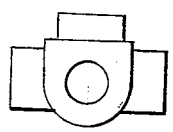
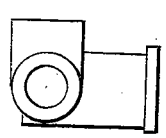
Fig 7.  Fig 8.
Fig 9.  Fig 10.
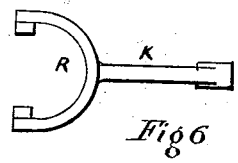
Fig 6.
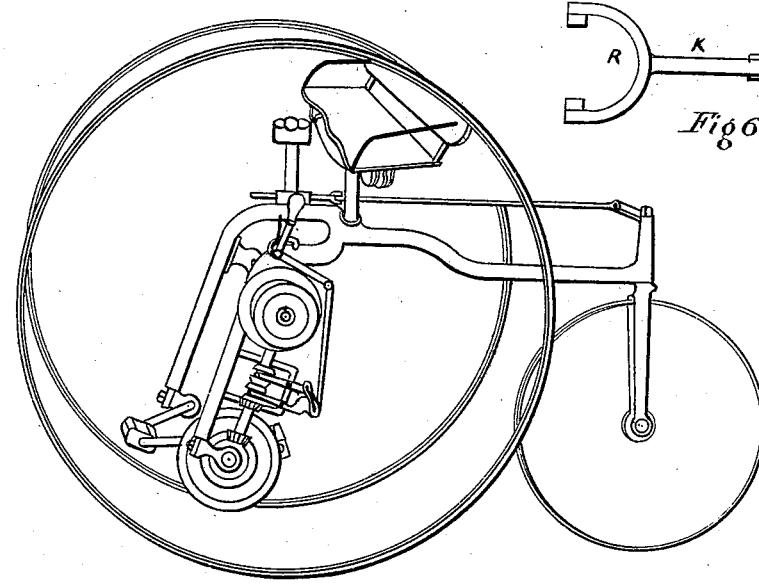
Fig 1.
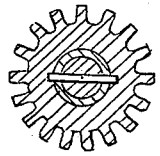
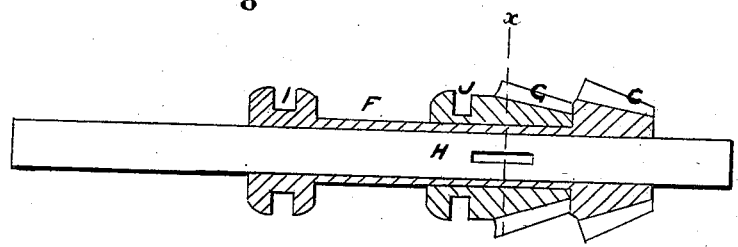
Fig 5.  Fig 4.
Witnesses
E. Gardner Cotton
J. Baldock
Inventor:
W. H. J. Grout
N. PETERS, Photo-Lithographer, Washington, D. C.

(No Model.) 3 Sheets—Sheet 2.

W. H. J. GROUT.
DIFFERENTIAL GEAR FOR VELOCIPEDES.

No. 254,639. Patented Mar. 7, 1882.

Witnesses
E. Gardner Colton
J. Baldock

Inventor:
W. H. J. Grout (No Model.) 3 Sheets—Sheet 3.

W. H. J. GROUT.
DIFFERENTIAL GEAR FOR VELOCIPEDES.

No. 254,639. Patented Mar. 7, 1882.

Witnesses

Inventor:

United States Patent Office.

WILLIAM H. J. GROUT, OF SOUTH HORNSEY, COUNTY OF MIDDLESEX, ENGLAND.

DIFFERENTIAL GEAR FOR VELOCIPEDES.

SPECIFICATION forming part of Letters Patent No. 254,639, dated March 7, 1882.

Application filed August 8, 1881. (No model.) Patented in England February 14, 1881.

*To all whom it may concern:*

Be it known that I, WILLIAM HENRY JAMES GROUT, of South Hornsey, in the county of Middlesex, England, engineer and bicycle manufacturer, have invented certain new and useful Improvements in Differential Gears for Driving Velocipedes, (for which I have obtained Letters Patent in Great Britain, No. 618, bearing date February 14, 1881,) of which the following is a specification.

The object of this invention is to provide means and apparatus whereby the difficulties experienced in propelling velocipedes up steep inclines and on heavy roads or against a strong wind may be more or less overcome, and steep hills mounted with comparative ease and descended with less danger.

To carry out my invention as applied to a tricycle, I attach to the driving wheel or wheels, or to the foot-cranks or other suitable part, sets of bevel-toothed wheels, made generally in pairs and fixed together or cast in one piece, their diameters being of different sizes.

Sometimes I use a small set of wheels as auxiliary to the others, to drive an extra wheel when double sets are not used on both driving-wheels. I gear or connect these wheels to the driving-wheels by an intermediate wheel or wheels carried by a spindle on which they slide, and moved by a forked lever with its pin fitted with a roller moving in a double-pitched cam-slot made in a bell-crank lever by means of a forked rod actuating the said spindle. This lever is moved on a stud working in a slot or hole made in the lever and held by a bracket on the frame of the machine, and kept in its place by a spring and pawl resting on the segment-plate, hereinafter described. When the machine is in motion the driving wheel or wheels run at the same rate as the foot-cranks, when the wheels are large, but when small driving-wheels are used (which I prefer for the use of ladies) their speed may be little faster than that of the foot-cranks. When the roads are heavy or when running against the wind, and more particularly when hills have to be ascended, I shift my driving-gear and so reduce the speed greatly, so that the foot-cranks turn about twice (more or less) to a single revolution of the driving wheel or wheels. By doing this I obtain greatly increased driving power, sufficient to ascend steep hills with greater ease than hitherto, and to descend without a brake. I can also put either or both wheels out of gear, so that one or both may run loose on their axles for turning round corners or running in circles. To make the movement simple in working I fix a segment plate or plates to the lever or frame of the machine, with points marked thereon for each operation, such as "speed," "power," "in," "out;" or I may merely mark them with figures or letters. To either of these points I can change instantly and without stopping the machine. When two driving-wheels are running on one axle one double set of gear only is required.

The above description applies to bicycles (otherwise known as "dicycles") making more than one track, as well as to tricycles; but the principle may be modified to suit the ordinary bicycle, the bracket carrying the apparatus being bolted to the front fork and the minor details altered accordingly.

My invention consists in the devices above described, combined as set forth in the claims; and in order more clearly to illustrate the best possible manner of performing my said invention, I refer to the accompanying drawings, in which—

Figure 3:
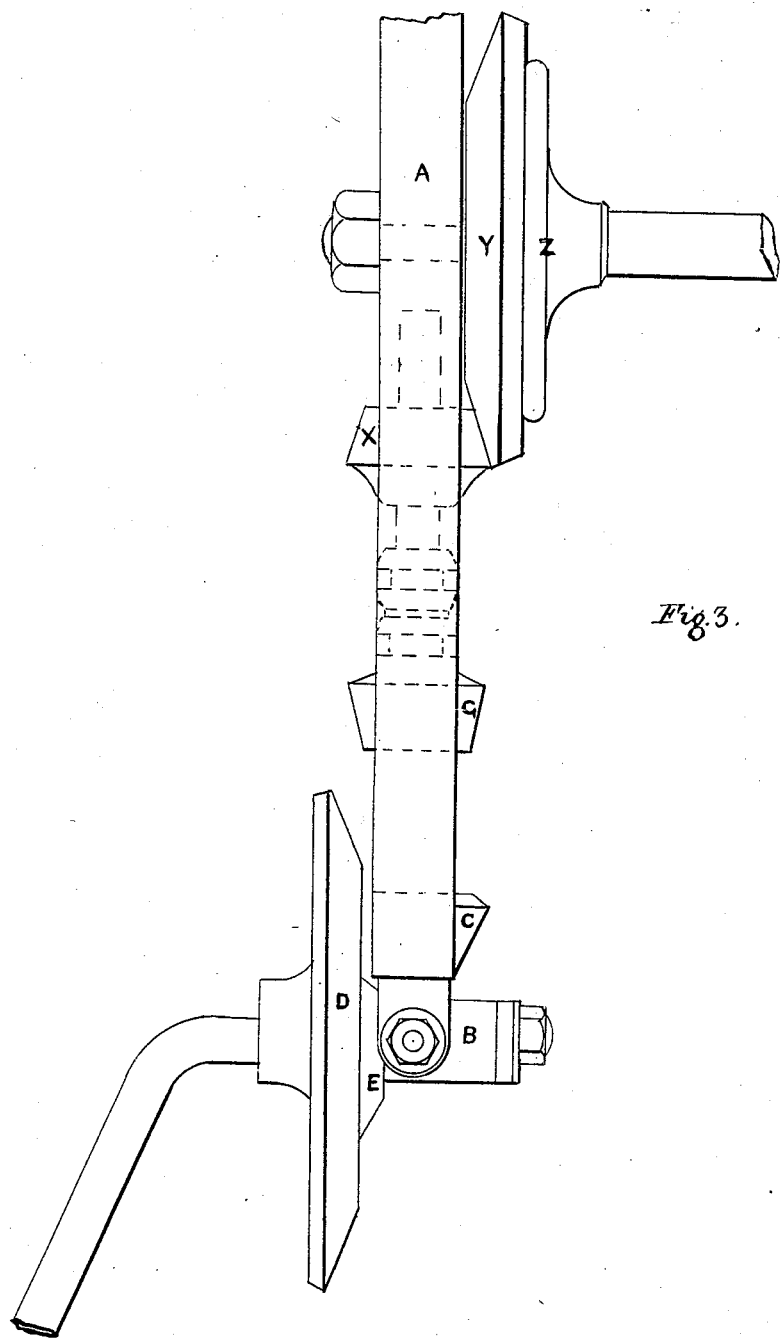

Figure 1 represents a perspective view of a tricyle constructed according to my invention, the spokes and other parts being removed in order not to complicate the drawing unnecessarily. Fig. 2 is a side view of my gearing; Fig. 3, an end view of the same; Fig. 4, a section of the sliding bevels, feather, and shaft; Fig. 5, a vertical section through $x\,y$, Fig. 4; Fig. 6, a plan view of the forked lever; Figs. 7 and 8, a side and end view of bracket on the lower end of the forks, and Figs. 9 and 10 a side and end view of the upper bracket.

Similar letters of reference indicate corresponding parts.

As shown, A is one of the main forks of the framing. At its lower end is carried a bracket, B, forming a double bearing. A side and end view of the bracket is shown in Figs. 7 and 8. Its upper end forms a bearing for the bevel-pinion C, and its lower end a bearing for the horizontal bevels D E, usually cast together. The pinion C moves on or with a feather, F, Figs. 7 and 5, on which the bevel-pinion wheel G is also mounted. Through this feather slides the rod H. Clutches or slotted pulleys I J are mounted on this feather.

To clutch I is connected the fork R of the lever K, shown in Fig. 6, and to clutch J the fork R' of lever L. These levers pivot on pins M N, fixed to bracket O. To the lower end of the lever L is attached a bell-crank, P, in which is made a double-pitched cam-slot, Q, and in which works a friction-roller, Q', carried by a pin on the end of lever K, so that when the bell-crank is moved it shall (when the pin and roller have passed the straight part of the cam-slot, where they move but slowly) impart a sudden movement to the lever K and quickly move the bevel-pinion G, bringing it in gear with bevel-wheel D.

The bell-crank is moved by a bell-crank lever, S, connected to a handle, T, carrying a pawl, U, operated by a spring, V, and moving in notches in segment-plate W, attached to the frame. On rod H is carried the bevel-pinion wheel X, driving the bevel-wheel Y, attached to the hub of the driving-wheel Z.

The double pitch of cam-slot Q consists of two reversed segmental slots, the lower part being of much slower pitch than the upper one. As the pinion C is jointed to or carried by the feather F, which is engaged at its upper part by the fork K, and as the bevel-pinion G, with the pulley or clutch J, also slides on the feather F, which in its turn slides on the spindle H, there are consequently two parts sliding one upon the other. The moment, therefore, when the forked lever L of the bell-crank P is lowered, which it must when the bell-crank S rises, the pinion G is compelled to descend; but at the same time the feather F and with it the pinion C are moved in upward direction on the spindle H, because the friction-roller Q' is traveling in the upper end of the cam-slot and raises the end of the lever K slowly. As soon as the roller Q' gets into the lower or straighter end of the slot the lever K is rapidly raised. Consequently the pinion C is quickly pulled out of gear, while the pinion G, as it comes down, gears with the larger bevel-wheel D. When pinion G is thus thrown into gear pinion C is midway between both bevels, gearing with neither. The reverse motion is imparted to the pinions C and G when the bell-crank S is thrown back again.

Figs. 9 and 10 show the upper bracket carrying the axle, and below the diagonal spindle H, operating the gear. If the handle T be moved to the second notch, (marked "out,") the bevel-pinions C G are drawn out of gear with wheels D and E, and the machine can be run down hill, the pedals not revolving.

To increase or decrease the speed and apply decreased or increased power, the handle can be moved to the first or third notches (marked "speed" and "power") in the segment-plate, (as shown it is geared for "power,") moving the bevel-pinions into gear with the desired bevel-wheels, as before described.

It is obvious that the details of my invention are capable of considerable modification without departing from the principle thereof.

Having thus described my invention, I claim as new and desire to secure by Letters Patent—

1. The combination, with the driving-shaft and treadle, of the sliding feather, the pinions and clutches thereon, the rod on which the feather slides, the pinion fixed to the end of the rod, the gear fixed to the driving-shaft, and the differential gears, substantially as described.

2. In a velocipede, the segmental gage-plate and spring-pawl, in combination with the handle T, lever S, cam Q, bell-crank P, levers K and L, bracket, and clutches, substantially as described.

3. In combination with the bevel-pinions C G, the forked rod K, and cam-slotted bell-crank P, the bell-crank lever S operating such, substantially as set forth.

4. In velocipede differential gear, the double-pitched cam-slot in the bell-crank for moving the lever R, in combination with lever L, both moved by lever S, so that different sliding velocities are imparted to the pinions in changing the gear from "power" to "speed," and vice versa, or throwing it out to insure the pinions instantly engaging with or being freed from the large bevel-wheels, substantially as specified.

In testimony that I claim the foregoing as my invention I have signed my name, in presence of two witnesses, this 21st day of July, 1881.

W. H. J. GROUT.

Witnesses:
 I. BOWER,
 H. S. WESTON,
  *Both of 5 Nicholas Lane, London, E. C.*